United States Patent
Buzbee

(10) Patent No.: US 6,219,832 B1
(45) Date of Patent: *Apr. 17, 2001

(54) SYSTEM AND METHOD OF USING ANNOTATIONS TO OPTIMIZE DYNAMICALLY TRANSLATED CODE IN THE PRESENCE OF SIGNALS

(75) Inventor: William B. Buzbee, Half Moon Bay, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,588

(22) Filed: Oct. 28, 1998

Related U.S. Application Data

(63) Continuation of application No. 08/731,098, filed on Oct. 9, 1996, now Pat. No. 5,838,978.

(51) Int. Cl.[7] .................................................. G06F 9/45

(52) U.S. Cl. ..................... 717/5; 717/9; 717/4; 703/23; 712/227; 714/38

(58) Field of Search .................. 714/38, 39; 395/500.43, 395/500.44, 705, 704, 709; 712/227; 717/5, 4, 9; 703/23

(56) References Cited

U.S. PATENT DOCUMENTS

| 4,951,195 | 8/1990 | Fogg et al. ...................... 395/500.41 |
| 5,133,072 | 7/1992 | Buzbee ................................ 395/709 |
| 5,313,614 | 5/1994 | Goettelmann et al. .............. 395/705 |
| 5,732,210 | 3/1998 | Buzbee ................................. 714/38 |
| 5,751,982 | 5/1998 | Morley ................................ 712/209 |
| 5,764,962 * | 6/1998 | Buzbee ........................... 395/500.44 |
| 5,838,978 * | 11/1998 | Buzbee ................................ 395/705 |
| 5,909,578 * | 6/1999 | Buzbee ................................ 395/704 |

OTHER PUBLICATIONS

Cmelik et al., "Shade: A Fast Instruction–Set Simulator for Execution Profiling," ACM Proceedings of the 1994 Conference on Measurement and Modeling of Computer Systems, May 16–20, 1994, pp. 128–137.*

Ashok Kumar, "The HP PA–800 RISC CPU" IEEE Micro, Mar.–Apr. 1997, vol. 17 Issue: 2, pp. 27–32.*

* cited by examiner

*Primary Examiner*—Tariq R. Hafiz
*Assistant Examiner*—Tuan Q. Dam
(74) *Attorney, Agent, or Firm*—Tuan V. Ngo

(57) ABSTRACT

A method and system of dynamically translating code that uses code annotations to determine whether the dynamic translator must fully materialize machine state. At compilation time, annotations are placed in an application's executable file indicating the number of formal parameters expected by each of the application's entry points. When the application is dynamically translated, the dynamic translation system (DTS) aggressively translates the application. Therefore, the DTS does not generate instructions for materializing the machine state at potential stopping points. When the application makes a system call that arms an exception handler, the DTS looks to the annotations to determine the number of formal parameters expected by the handler. If an exception handler expects two or fewer parameters, then that handler does not use the machine state. Conversely, if a handler expects three or more parameters, then that handler may use the machine state. Therefore, if the handler only has two formal parameters, then the DTS continues to aggressively translate the application program. Otherwise, the DTS discards all of the previously translated code and starts conservatively translating the application.

22 Claims, 2 Drawing Sheets

SYSTEM AND METHOD OF USING ANNOTATIONS TO OPTIMIZE DYNAMICALLY TRANSLATED CODE IN THE PRESENCE OF SIGNALS

CROSS REFERENCE TO RELATED APPLICATIONS

This is a continuation of application Ser. No. 08/731,098 filed on Oct. 9, 1996, now U.S. Pat. No. 5,838,978, the entire disclosure of which is incorporated herein by reference. This application is related to the application entitled METHOD AND SYSTEM OF BURST PROFILING USING DYNAMIC RECOMPILATION, application Ser. No. 08/719,854, filed Sep. 30, 1996, now U.S. Pat. No. 5,909,578, which is hereby incorporated by reference.

TECHNICAL FIELD OF THE INVENTION

This invention pertains in general to code migrating and optimizing compilers and in particular to optimizing dynamically translated code.

BACKGROUND OF THE INVENTION

A "dynamic translator" is computer program that translates an application program from a first to a second format while the application is executing. Typically, the dynamic translator translates a code block into the second format as program flow enters that code block. Then, the dynamic translator executes the translated code block within an emulated computer system. A dynamic translator can be used, for example, to run a SUN SPARC executable file on a PA RISC computer system by translating the application and emulating a SUN SPARC computer system.

When executing the application, the dynamic translator must accurately simulate the entire state and actions of the emulated computer system. Signal handling is one of the most difficult aspects of the computer system to simulate. Normally, if an application were executing and a signal arrived, then the operating system would create a snapshot of the machine state of the application as it existed when the signal arrived. This snapshot contains the values of all registers, the program counter, and the status bits. In short, the snapshot contains all visible CPU state information.

Therefore, if the application is executing under an emulator, the emulator needs to present the same snapshot when a signal arrives. Presenting the snapshot to the application, however, is very difficult. When the signal arrives, the operating system stops the translator and gives the translator a snapshot of the translation system itself, rather than a snapshot of the application. Accordingly, the translation system must create its own snapshot of the emulated computer system and application. Therefore, the translation system needs to track all visible state information for the emulated CPU.

When the translation system is emulating a CPU, however, it is desirable that the emulator not fully model the machine state. Consider, for example, the INTEL X86 architecture. The X86 architecture includes a large number of condition code flags. Each time the CPU executes an ADD instruction, the CPU sets flags indicating, among other things, whether the result was zero, greater than zero, or in parity. Accordingly, if the translation system fully models the CPU, every time it emulates an ADD it also has to materialize the values of the CPU flags. This emulation can be quite expensive in terms of system resources.

Moreover, there are many times when these flags are never used. Consider, for example, when the application executes three ADD instructions in a row. Each ADD instruction does not consume any flags, but instead sets them. If the translator knows that execution cannot stop in between the three ADDS, then there is no point in emulating the flags set by the first and second ADDs. Therefore, there is no need for the translator to materialize CPU flags for points at which execution cannot stop.

However, a LOAD instruction can generate a trap and thereby stop execution. A trap could occur, for example, if the instruction loads from an invalid address or performs a misaligned memory reference. If the instruction sequence is ADD, LOAD, ADD, then there is a possible stop point between the ADD instructions. Therefore, the translator must materialize the CPU flags because the flags might be consumed by a signal handler if the LOAD instruction traps. In sum, to fully implement signal handling, the translator must fully materialize the entire emulated machine state at any point at which execution could stop.

Still, the overwhelming majority of the machine state variables are never consumed. Accordingly, the translator wastes a lot of resources materializing the variables. Additionally, the translator attempts to execute the application as fast as is possible. For this reason, the translations are optimized using techniques such as out-of-order execution. If the instructions are being moved around and executed out of order, then it is sometimes impossible to generate a fully materialized machine state.

Therefore, there is a need in the art for a translator that properly handles signals but does not necessarily fully materialize the machine state.

There is also a need in the art for a translator that properly handles signals but operates quickly and efficiently.

In addition, there is a need in the art for a translator that properly handles signals while allowing code optimizations such as instruction reordering.

SUMMARY OF THE INVENTION

The above needs are met by a method and system of dynamically translating code that uses code annotations to determine whether the dynamic translator must fully materialize machine state. When an application is compiled, the compiler determines the number of formal parameters expected by each of the application's entry points. Then, the compiler stores annotations indicating each entry point's number of formal parameters in the application's executable file.

When the application is dynamically translated, the dynamic translation system (DTS) aggressively translates the application. "Aggressive translation" means that the DTS assumes the application will not stop at any potential stopping point. Therefore, the DTS does not generate instructions for materializing the machine state at those points.

The DTS intercepts all system calls made by the application. If a signal call does not arm an exception handler, then the DTS continues to execute the application in aggressive mode. If, however, the signal call arms an exception handler, then the DTS looks to the annotations to determine the number of formal parameters expected by the handler.

The number of formal parameters is relevant because, when an exception occurs, the machine state is the third formal parameter passed with the exception signal. Therefore, if an exception handler expects two or fewer parameters, then that handler does not use the machine state. Conversely, if a handler expects three or more parameters, then that handler may use the machine state.

Therefore, the DTS determines whether the exception handler has two or fewer formal parameters. If so, then the DTS continues to aggressively translate the application program. If, however, the exception handler has more than two formal parameters, then the DTS switches to conservative translation. This switch is performed by discarding all previously translated code. Then, all subsequent code is translated with instructions for materializing the machine state at all possible stopping points.

A technical advantage of the present invention is that the dynamic translator properly handles signals yet does not introduce unnecessary instructions for materializing the machine state.

Another technical advantage is that code optimizations such as instruction reordering can be used to the fullest possible extent.

Yet another technical advantage is that the translated code is extremely efficient.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 3:
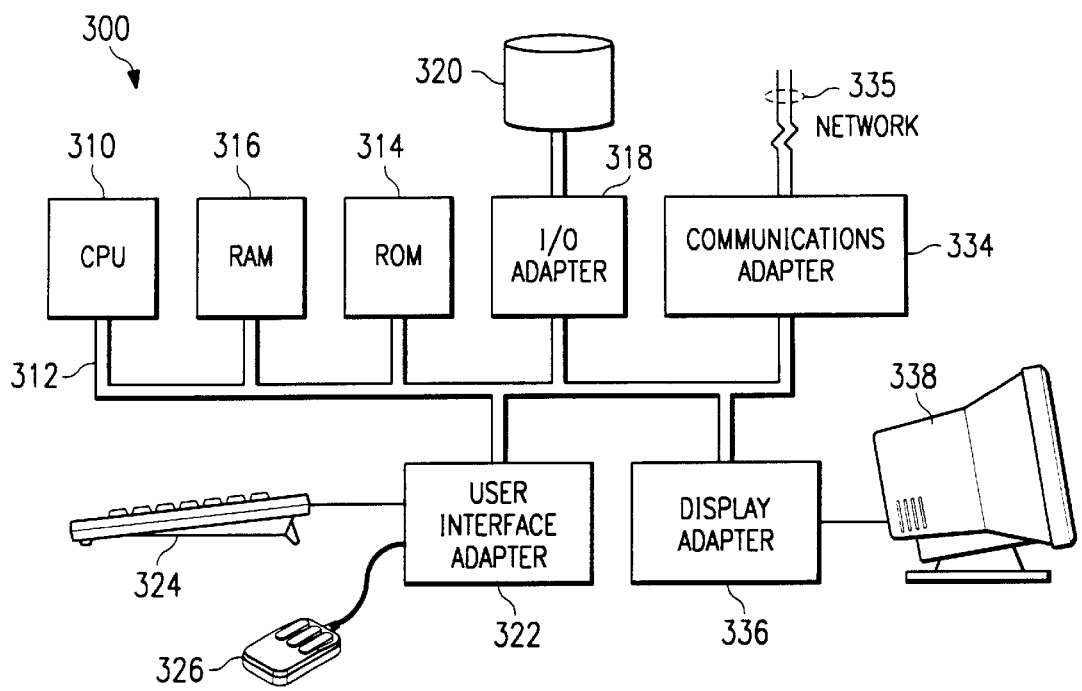
FIG. 3 is a high-level block diagram of a computer system adapted to execute the present invention.

FIG. 3 illustrates a computer system 300 adapted to execute the present invention. Central processing unit (CPU) 310 is coupled to bus 312. In addition, bus 312 is coupled to random access memory (RAM) 316, read only memory (ROM) 314, input/output (I/O) adapter 318, communications adapter 334, user interface adapter 322, and display adapter 336.

CPU 310 may be any general purpose CPU, such as a HP PA-8000. However, the present invention is not restricted by the architecture of CPU 310 as long as CPU 310 supports basic signal handling operations described below.

RAM 316 and ROM 314 hold user and system data and programs as is well known in the art. I/O adapter 318 connects storage devices, such as hard drive 320, to the computer system. Communications adaption 334 is adapted to couple the computer system to local or wide-area network 335. User interface adapter 322 couples user input devices, such as keyboard 324 and pointing device 326, to the computer system. Finally, display adapter 336 is driven by CPU 310 to control the display on display device 338.

As used herein, "dynamic translation system" (DTS) refers to a computer program that translates a second computer program, or application, from a first to a second format while the application is executing. The application executes within an emulated computer system maintained by the DTS. In most cases, the DTS executes an application that was designed to execute on a computer system other than system 300. Accordingly, the DTS translates the application's machine instructions from its native language to the language of computer system 300 while emulating the application's native computer.

It is possible, however, that the emulated computer system is identical to system 300. In such cases, the DTS can be used to profile or re-optimize the application. Further information regarding DTS's can be found in the application entitled METHOD AND SYSTEM OF BURST PROFILING USING DYNAMIC RECOMPILATION [Attorney Docket No. 10960406-1] filed Sep. 30, 1996, which is hereby incorporated by reference.

The term "operating system" (OS) refers to a computer program that executes on and controls computer system 300. A preferred embodiment of the present invention uses the HP-UX OS, although it could easily be adapted to execute on other variants of *NIX or different OS's.

A "compiler" is a computer program that translates the instructions of the application from a high-level programming language into machine language. Typically, the high-level program source code will contain a number of code blocks called procedures. Each procedure has at least one entry point into which program execution can flow. Each entry point can be passed zero or more parameters. The parameters are then consumed by the procedure. An "optimizer" is a computer program that reviews a compiled or dynamically translated computer program and enhances the code with respect to speed and efficiency. As is well known in the art, all software programs discussed herein typically reside on hard drive 320 and are executed from RAM 316.

Figure 1:
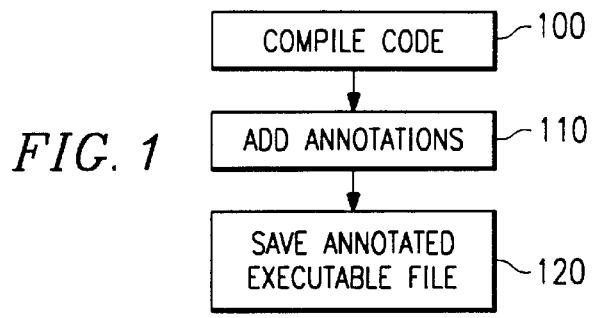
FIG. 1 is a flow chart describing a compilation process according to the present invention.

FIG. 1 is a flow chart describing a compilation process according to the present invention. At step 100, the compiler compiles the application's high-level source code into object code. During the compilation, the compiler adds annotations to each entry point of each procedure (step 110). The annotation describe the number of formal parameters that were declared for that procedure. The annotations are physically placed into the application's executable file. At step 120, the annotated object code is linked and converted into an annotated executable application.

Figure 2:
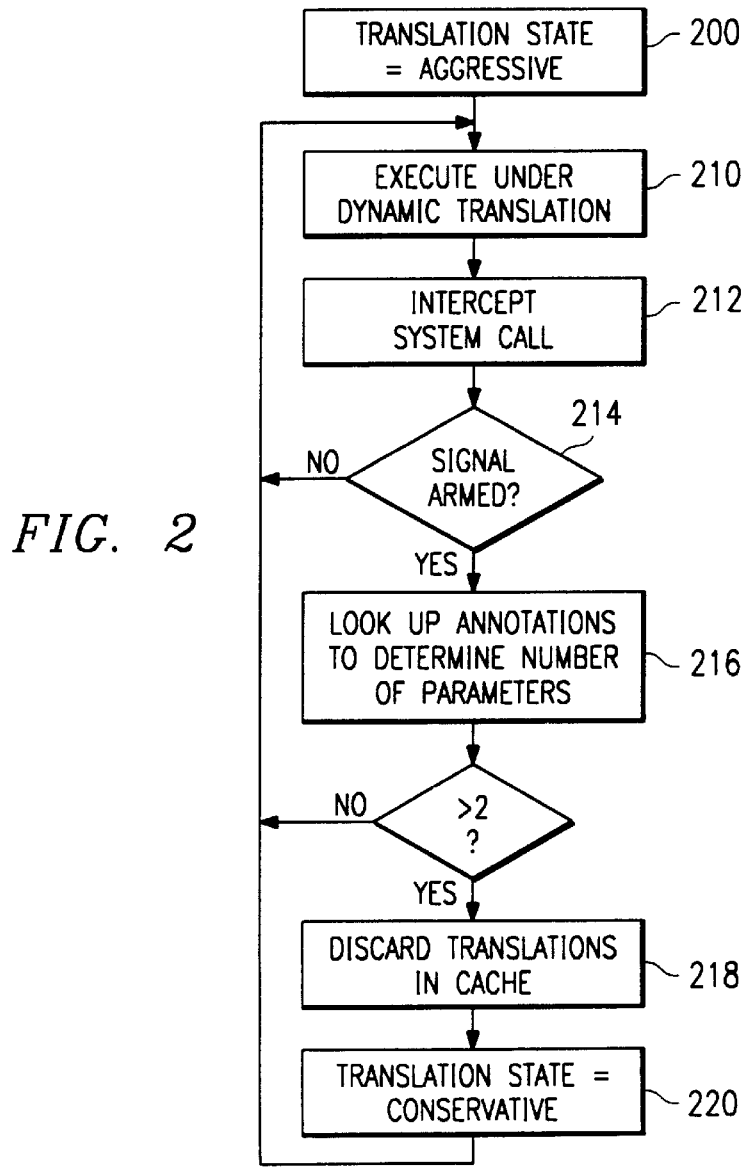
FIG. 2 is a flow chart describing how an annotated application is executed by a dynamic translation system according to the present invention.

FIG. 2 is a flow chart describing how the annotated application executes under the DTS. At step 200, a TRANSLATION STATE global variable is set. The TRANSLATION STATE variable has two states, AGGRESSIVE and CONSERVATIVE, and is initially set to AGGRESSIVE.

The AGGRESSIVE setting tells the DTS that memory references are not necessarily stopping locations. Accordingly, whenever the DTS aggressively translates a memory reference instruction, the DTS assumes that it will not have to recover state should that memory reference trap. Therefore, the DTS does not generate instructions that materialize unused machine state variables, such as ADD condition code flags.

Furthermore, code optimizations, especially in modern architectures, often involve reordering instructions in order to more efficiently use the computer system. Consider, for example, an A+B instruction followed by a B+C instruction.

Since these instructions are independent of each other, the instructions can legally be performed in a different order. Therefore, an optimizer can freely reorder the instructions.

If, however, there is a LOAD instruction between the A+B and B+C, then there is a potential stopping point between the two ADDs. Now, the A+B instruction must be performed before the B+C instruction. This dependency restricts the optimizations that can be performed by the DTS. In AGGRESSIVE mode, the dependency introduced by the LOAD instruction can be ignored.

In sum, when the DTS translates in AGGRESSIVE mode, it assumes that the application is not going to use the machine state. Therefore, the DTS does not include instructions necessary to collect the machine state. Since the machine state is not collected, instructions which might trap are not barriers to optimization.

The CONSERVATIVE mode, in contrast, indicates that the DTS must be able to generate a machine state after each memory reference. Thus, CONSERVATIVE mode assumes the worst case scenario in which every one of the instructions which can trap does, in fact, trap. As a result, the DTS must fully represent machine state at the trapping point and cannot reorder instructions across those points.

Note that a preferred embodiment of the DTS uses a translator in combination with an optimizer. In this embodiment, the translator always conservatively translates the application. That is, the translator always produces translated code that fully materializes state. Then, if the DTS is in AGGRESSIVE mode, the optimizer removes the unnecessary state-materializing instructions from the translated code.

At step 210, the DTS dynamically translates the application. The DTS retrieves a code block from the application, translates the code block, optimizes the code block, and then stores the code block in a code cache. Then, the code block is executed from the cache. Subsequent code blocks are dynamically translated as the code blocks are needed by the application. Since the DTS starts in AGGRESSIVE mode, whenever it translates a memory reference instruction the DTS assumes it will not need to recover the machine state should the memory reference trap.

As shown by step 212, the DTS intercepts and examines all system calls made by the application. At step 214, the DTS determines whether the application is using the system call to arm a signal handler. If so, then the DTS determines whether the signal handler is related to memory faults. Such signal handlers include SIGBUS, which indicates a bus error, and SIGSEGV, which indicates an illegal storage access. If the system call is not being used to arm a memory fault signal handler, then the DTS returns to step 210.

If, however, the application is using the system call to arm a signal handler related to memory faults, then the DTS moves to step 216. At step 216, the DTS determines the address of the signal handling routine.

Then, the DTS looks in the application file for the annotation corresponding to the routine's address. From the annotation, the DTS determines the number of formal parameters that the routine is expecting to receive.

By examining the routine's formal parameters, the DTS can determine whether the DTS must generate a complete machine state. As mentioned above, a preferred embodiment of the present invention uses the HP-UX OS. HP-UX has a three mechanisms for accessing a signal: the signal interface, the sigvector interface, and the sigaction interface. Most applications use signal, the simplest of the three interfaces.

Moreover, most applications that use the signal interface only care about the number (i.e., the type) of the signal that has arrived. A signal's number is the first parameter passed with the signal. Therefore, most applications define a signal handler with only a single formal parameter—the signal number. Such signal handlers typically print a message indicating that an error occurred and then die.

More sophisticated applications, in contrast, may define a handler that uses the machine state. If so, then the handler needs to be declared with three formal parameters. Three parameters are necessary because the sigcontext, or machine state, is the third parameter.

Accordingly, if a routine expects to receive two or fewer formal parameters, then the routine will not use the machine state. Therefore, the DTS can remain in AGGRESSIVE mode. Consequently, the DTS moves from step 216 to step 210. At step 210, it continues to execute the application using aggressive dynamic translation.

If the routine expects to receive three or more formal parameters, however, then the routine might use the machine state. As a result, the DTS must switch to CONSERVATIVE mode. This switch begins at step 218. At step 218, the DTS discards all existing code translations. These translations must be discarded because, prior to the arming of the signal, the DTS might have already translated some code using aggressive expectations. As soon as the application arms the signal, the previously translated code is incorrect.

Next, at step 220, the DTS sets the global TRANSLATION STATE variable to CONSERVATIVE. Then, the DTS returns to step 210. At step 210, the DTS executes the application under dynamic translations while treating all memory references as possible stopping points. Execution continues until the application is finished.

Although the above discussion focuses primarily on memory fault signals, it is important to recognize that the present invention can be used with all types of signals. Moreover, the present invention can be configured to apply different translation state optimizations to different types of signals and traps.

The TRANSLATION STATE variable in FIG. 2, for example, could be divided into a translation state variable for each signal type. Thus, there could be a translation state for instructions that could generate bus error traps, a translation state for signals that could generate arithmetic traps, and a translation state for other types of traps. If an application arms an arithmetic trap with a handler having three parameters but also arms a bus error with handler having only two parameters, then the optimizer could be aggressive for memory operations but conservative for arithmetic operations.

Although the present invention and its advantages have been described in detail, it should be understood that various changes, substitutions and alterations can be made herein without departing from the spirit and scope of the invention as defined by the appended claims.

What is claimed is:

1. A method of dynamically translating an application in a computer system, the method comprising the steps of:

translating the application in a first manner to produce translated blocks;

executing the translated blocks in an emulated computer system;

receiving a system call made by an executing block;

determining whether a signal handler is capable of using a machine state of the emulated computer system in handling the system call; and translating the application in a second manner that is different from the first manner, if the signal handler can use the machine state in handling the system call.

2. The method of claim 1, wherein the application has been annotated with at least one annotation to indicate a number of parameters expected at least one entry point of the application, the determining step comprises the step of:

examining the annotation.

3. The method of claim 2, wherein the annotation indicates a number of parameters expected by the signal handler.

4. The method of claim 3, wherein the signal handler can use the machine state if the signal handler expects at least a predetermined number of parameters.

5. The method of claim 4, wherein the predetermined number represents a number of parameters that are declared with the signal handler and includes a machine state parameters.

6. The method of claim 1, wherein the second manner is a conservative manner and the blocks translated by the step of translating the application in the first manner are stored in the computer system, the step of translating the application in the conservative manner comprises the steps of:

discarding the stored translated blocks; and generating code to materialize the machine state at a potential stopping point in the application.

7. The method of claim 1, wherein the first manner is an aggressive manner, the step of translating the application in the aggressive manner comprises the step of:

removing code that materializes the machine state at a potential stopping point in the application.

8. A computer program product for dynamically translating an application in a computer system, the computer program product comprising:

a computer usable medium having computer program logic recorded thereon, the computer program logic comprising:

means for annotating the application with at least one annotation;

means for translating the application to execute in an emulated computer system, means for determining from the annotations whether the application can use a machine state of the emulated computer system; and wherein the means for translating translates the application in a first manner if the application can not use the machine state, and translates the application in a second manner different from the first manner if the application can use the machine state.

9. The computer program product of claim 8, wherein the means for annotating comprises:

means for determining a number of parameters expected by each entry point in the application; and means for storing annotations indicating the number of parameters on the computer useable medium.

10. The computer program product of claim 8, wherein the means for determining comprises:

means for receiving a system call from the application; and means for determining a number of parameters expected by the signal handler from the annotations;

wherein the means for determining determines whether the signal handler is capable of using a machine state of the emulated computer system in handling the system call.

11. The computer program product of claim 10, wherein the application uses the machine state if the signal handler expects at least a predetermined number of parameters.

12. The computer program product of claim 11, wherein the predetermined number represents a number of parameters that are declared with the signal handler and includes a machine state parameter.

13. The computer program product of claim 8, wherein the means for translating the application comprises:

means for generating instructions to materialize the machine state at a potential stopping point in the application.

14. The computer program product of claim 13, wherein the means for translating further comprises:

means for aggressively translating the application in the first manner by removing the instructions that materialize the machine state.

15. The computer program product of claim 13, wherein the means for translating further comprises:

means for conservatively translating the application in the second manner by discarding previous aggressive translations of the application.

16. A dynamic translator for dynamically translating an application in a computer system, the translator comprising:

means for translating the application in a first manner to produce translated blocks;

means for executing the translated blocks in an emulated computer system;

means for receiving a system call made by an executing block;

means for determining whether a signal handler is capable of using a machine state of the emulated computer system in handling the system call; and means for translating the application in a second manner that is different from the first manner, if the signal handler can use the machine state in handling the system call.

17. The translator of claim 16, wherein the application has been annotated with at least one annotation to indicate a number of parameters expected at least one entry point of the application, the means for determining comprises:

means for examining the annotation.

18. The translator of claim 17, wherein the annotation indicates a number of parameters expected by the signal handler.

19. The translator of claim 18, wherein the signal handler can use the machine state if the signal handler expects at least a predetermined number of parameters.

20. The translator of claim 19, wherein the predetermined number represents a number of parameters that are declared with the signal handler and includes a machine state parameter.

21. The translator of claim 16, wherein the second manner is a conservative manner and the blocks translated by the means for translating the application in the first manner are stored in the computer system, the means for translating the application in the conservative manner comprises:

means for discarding the stored translated blocks; and means for generating code to materialize the machine state at a potential stopping point in the application.

22. The translator of claim 16, wherein the first manner is an aggressive manner, the means for translating the application in the aggressive manner comprises:

means for removing code that materializes the machine state at a potential stopping point in the application.

* * * * *